US012118083B2

(12) United States Patent
Soffer

(10) Patent No.: US 12,118,083 B2
(45) Date of Patent: Oct. 15, 2024

(54) SYSTEM AND METHOD FOR DETECTION AND PREVENTION OF CYBER ATTACKS AT IN-VEHICLE NETWORKS

(71) Applicant: HIGH SEC LABS LTD., Caesarea (IL)

(72) Inventor: Aviv Soffer, Caesarea (IL)

(73) Assignee: HIGH SEC LABS LTD., Caesarea (IL)

( * ) Notice: Subject to any disclaimer, the term of this patent is extended or adjusted under 35 U.S.C. 154(b) by 210 days.

(21) Appl. No.: 17/795,564

(22) PCT Filed: May 9, 2021

(86) PCT No.: PCT/IB2021/053931
§ 371 (c)(1),
(2) Date: Jul. 27, 2022

(87) PCT Pub. No.: WO2021/234499
PCT Pub. Date: Nov. 25, 2021

(65) Prior Publication Data
US 2023/0087311 A1 Mar. 23, 2023

Related U.S. Application Data

(60) Provisional application No. 63/028,101, filed on May 21, 2020.

(51) Int. Cl.
*G06F 21/55* (2013.01)
*H04L 9/40* (2022.01)
(52) U.S. Cl.
CPC ...... *G06F 21/554* (2013.01); *G06F 2221/034* (2013.01)

(58) Field of Classification Search
CPC ............ G06F 21/554; G06F 2221/034; H04L 63/1416; H04L 63/1425; H04L 63/1408; H04W 4/48; H04W 12/122; H04W 24/08
See application file for complete search history.

(56) References Cited

U.S. PATENT DOCUMENTS

| 9,401,923 B2 | 7/2016 | Valasec et al. |
| 9,616,828 B2 | 4/2017 | Ben Noon et al. |
| 9,668,133 B2 | 5/2017 | Kennedy |

(Continued)

OTHER PUBLICATIONS

Zhang et al., "A Cyber Security Evaluation Framework for in-Vehicle Electrical Control Units," IEEE Access Year: 2021 | vol. 9 | Journal Article | Publisher: IEEE.

(Continued)

*Primary Examiner* — Roderick Tolentino
(74) *Attorney, Agent, or Firm* — AlphaPatent Associates Ltd.; Daniel J. Swirsky

(57) ABSTRACT

A cyber security system for in-vehicle networks comprises a plurality of electronic control units (ECUs) communicating via a vehicle bus. The system comprises a plurality of bus security units (BSUs), wherein each BSU is configured to be connected between the vehicle bus and one of the ECUs, and the BSUs communicating via a security bus separate from the vehicle bus. Each BSU is configured to monitor the activity of the corresponding ECU, on the vehicle bus, send the monitored activity to another BSU on the security bus and detect abnormal communication on the vehicle bus.

20 Claims, 10 Drawing Sheets

(56) References Cited

U.S. PATENT DOCUMENTS

| | | | |
|---|---|---|---|
| 10,440,120 B2 | 10/2019 | Galula et al. | |
| 10,666,615 B2 | 5/2020 | Grau | |
| 10,897,469 B2 | 1/2021 | Hirshberg et al. | |
| 11,005,880 B2 | 5/2021 | Dyakin et al. | |
| 11,048,797 B2 | 6/2021 | Litichever et al. | |
| 11,165,851 B2 | 11/2021 | Galula et al. | |
| 11,411,917 B2 | 8/2022 | Grau | |
| 11,822,649 B2* | 11/2023 | Kerstein | H04L 63/1441 |
| 2009/0183033 A1* | 7/2009 | Ando | H04L 43/0823 714/43 |
| 2016/0188396 A1* | 6/2016 | Sonalker | G06F 11/079 714/37 |
| 2016/0373449 A1* | 12/2016 | Haga | H04W 12/12 |
| 2018/0012019 A1* | 1/2018 | Harris | G06F 21/554 |
| 2019/0052653 A1 | 2/2019 | Galula et al. | |
| 2019/0141074 A1* | 5/2019 | Oka | H04L 43/50 |
| 2019/0173902 A1* | 6/2019 | Takahashi | G06N 99/00 |
| 2019/0173912 A1* | 6/2019 | Ujiie | H04L 12/40 |
| 2019/0217869 A1* | 7/2019 | Takeuchi | G06F 11/3013 |
| 2019/0260772 A1 | 8/2019 | Juliato et al. | |
| 2021/0070321 A1* | 3/2021 | Serizawa | G07C 5/0808 |
| 2022/0206909 A1* | 6/2022 | Ishikawa | G06F 11/2028 |

OTHER PUBLICATIONS

Lee et al., "Practical Vulnerability-Information-Sharing Architecture for Automotive Security-Risk Analysis," IEEE Access Year: 2020 | vol. 8 | Journal Article | Publisher: IEEE.*

* cited by examiner

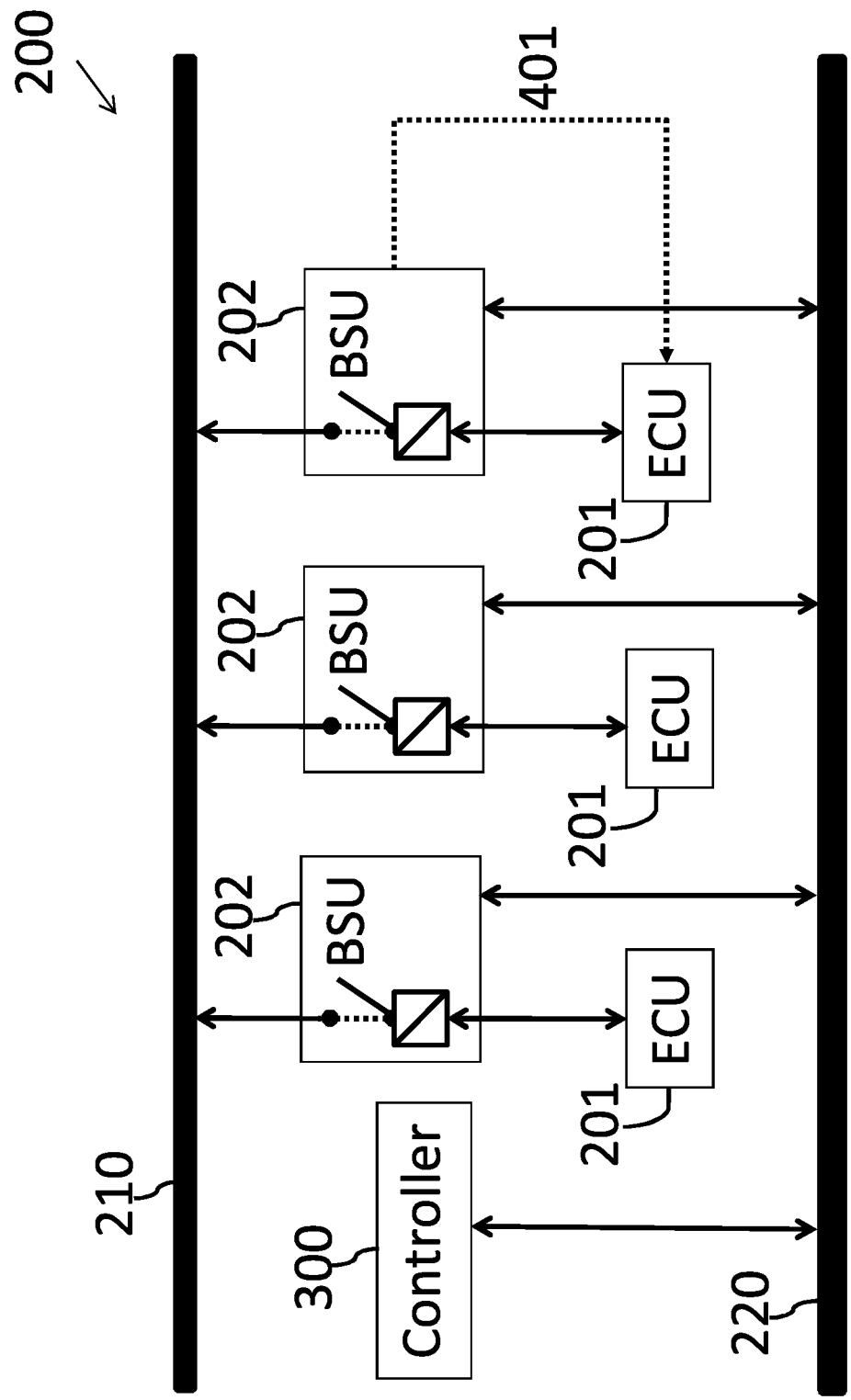

SYSTEM AND METHOD FOR DETECTION AND PREVENTION OF CYBER ATTACKS AT IN-VEHICLE NETWORKS

FIELD OF THE INVENTION

The present invention relates to in-vehicle computer networks. More particularly, the present invention relates to systems and methods for detection and prevention of cyber-attacks at in-vehicle computer networks.

BACKGROUND OF THE INVENTION

In recent years, the majority of vehicles (e.g., cars, trains, planes and ships) have been equipped with computing components (e.g., a microcontroller) to monitor and/or control different elements of the vehicle. In-vehicle networks allow internal communication between various components of a vehicle (e.g., air conditioning system, diagnostics, engine, etc.) by communicating with different electronic control units (ECUs). ECUs exchange data among themselves during the normal operation of the vehicle via the in-vehicle network.

For example, the operation of the engine may be monitored to issue an alert to the operator upon identification of a problem. In another example, the engine ECU needs to tell the transmission ECU what the engine speed is, and the transmission needs to tell other modules when a gear shift occurs.

Some of these vehicles also get communication modules for access to external wireless networks, such as cellular networks (e.g., for Internet access), satellite networks (e.g., for GPS), etc. As vehicles become more connected to wireless networks, the risk for cyber-attacks increases accordingly. Usually, the ECUs which are directly connected to the outside world through external interfaces (such as telematics, multimedia, etc.) may pose the highest risk for cyber-attacks.

Such vehicles typically use a vehicle bus as an internal communications network that interconnects components inside a vehicle, for instance a controller area network (CAN bus) as a message-based protocol, designed to allow microcontrollers and devices, such as ECUs, to communicate with each other's applications without a host computer.

Using CAN, the ECUs have a single CAN interface rather than analog and digital inputs to every device in the system. All devices (e.g., ECUs) on the network see all transmitted messages, such that each device can decide if a message is relevant or if it should be filtered.

However, the CAN bus is considered to be an untrusted protocol, for at least one of the following reasons: due to a rouge/failed ECU (e.g., due to physical/network tampering), due to a damaged bus cabling or ECU, due to an electromagnetic pulse (for example as a result of nuclear event), etc. If the CAN bus fails, the bus may still function correctly but specific ECU may fail or may compromise the system by injecting false information intended to other ECUs, by prevention of successful transmission of critical messages from other ECUs, by sending of bad control functions to their local controlled objects, etc. For example, shutting down the engine or steering the vehicle to the left side.

A possible threat to the CAN bus may include multicast messaging, where passive attackers may listen in on the communication (e.g., by tapping into the diagnostics port of the vehicle or inserting a malicious node onto the CAN bus), since every access point or controller on the bus has access to all messages.

Another possible threat to the CAN bus may include a masquerade attack due to lack of authentication, since the nodes (or ECUs) do not ensure the message they receive is from a valid source.

Another possible threat to the CAN bus may include sending/receiving information without any verification that the source of information is valid, due to lack of identification addressing.

Another possible threat to the CAN bus may include a common point of entry, where attacker has access to the CAN bus via a common gateway (e.g., via the diagnostics port).

Another possible threat to the CAN bus may include limited bandwidth, and accordingly may prevent robust authentication processes. For example, the 11-bit and 29-bit identifier message structures of the CAN bus only allows for 64 bits of data in the payload, leaving little room for additional data for security purposes.

Another possible threat to the CAN bus may include lack of encryption, since in order to implement a robust encryption of data the CAN bus would need a larger bandwidth than what is available.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4A shows a block diagram of the cyber security system with an ECU reset request, according to some embodiments of the invention;

Figure 1:
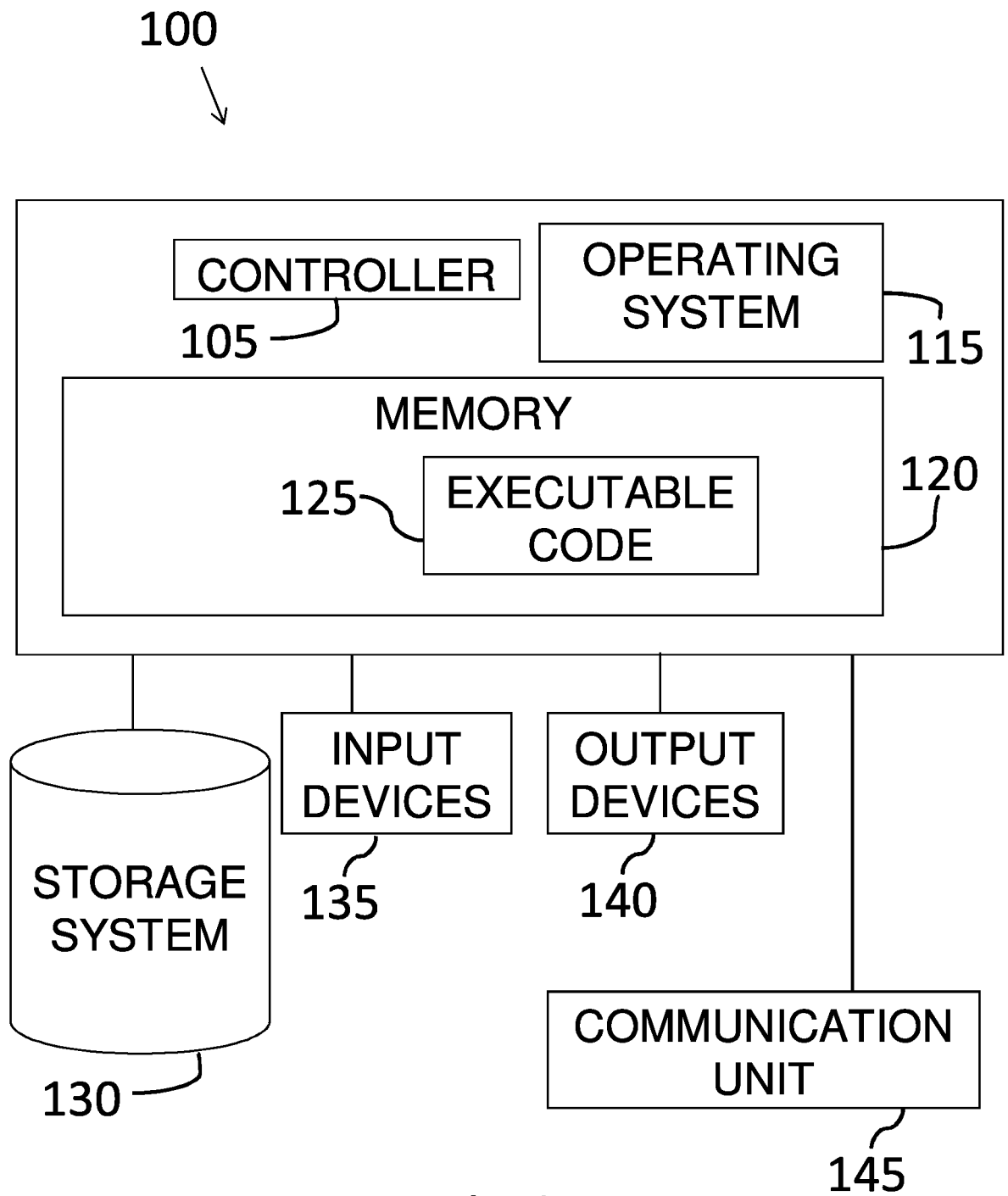
FIG. 1 shows a block diagram of an exemplary computing device, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, which is a schematic block diagram of an example computing device, according to some embodiments of the invention. Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet. Controller 105 may be configured to execute program code to perform operations described herein. The system described herein may include one or more computing device 100, for example, to act as the various devices or the components shown in FIGS. 2A-2C. For example, system 200 may be, or may include computing device 100 or components thereof.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to some embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be, for example, a memory, a disk drive, or a USB flash memory, encoding, including or storing instructions, e.g., computer-executable instructions, which, when executed by a processor or controller, carry out methods disclosed herein. The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more facility computing device 100 and one or more remote server computers in active communication with one or more facility computing device 100 such as computing device 100, and in active communication with one or more portable or mobile devices such as smartphones, tablets and the like.

Figure 2A:
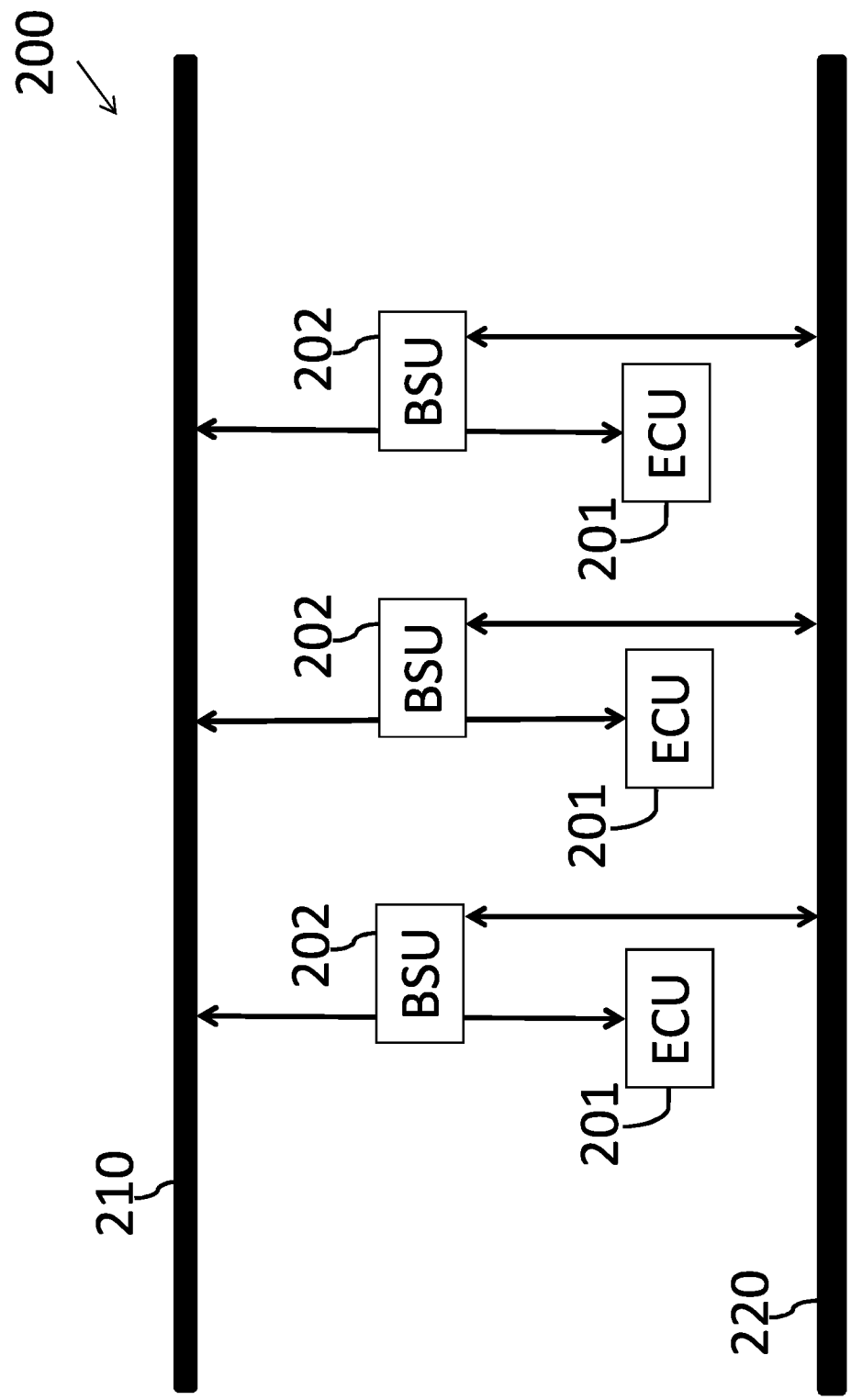
FIG. 2A shows a block diagram of a cyber security system for in-vehicle networks having a plurality of electronic control units (ECUs) communicating via a vehicle bus, according to some embodiments of the invention.

Reference is now made to FIG. 2A, which shows a block diagram of a cyber security system 200 for in-vehicle networks having a plurality of electronic control units (ECUs) 201 communicating via a vehicle bus 210, according to some embodiments. In FIG. 2A, hardware elements are indicated with a solid line and the direction of arrows may indicate the direction of information flow.

In some embodiments, the vehicle bus 210 may be a controller area network (CAN) bus. For example, the vehicle bus 210 may include various versions of vehicle bus protocols such as CAN bus 2.0, CAN bus 2.0A, CAN bus 2.0B, CAN FD 1.0, ISO-11898, etc. It should be noted that while only the CAN bus is described hereinafter, other versions or updates of the vehicle bus protocol may be similarly applied.

The cyber security system 200 may be applied to an existing in-vehicle network of a vehicle (e.g., a car, a train, a plane, etc.), with a plurality of ECUs 201 communicating via the CAN bus 210. For example, one of the ECUs 201 may be coupled to the fuel tank (e.g., with a dedicated sensor) and send messages with fuel tank status via the CAN bus 210.

According to some embodiments, a security bus 220 may be installed as a trusted network in the vehicle with the existing in-vehicle network of ECUs 201, where the security bus 220 is separate from the CAN bus 210. For example, the security bus 220 may include an optical and/or copper local area network (LAN) used for security.

According to some embodiments, the cyber security system 200 may include a plurality of bus security units (BSUs) 202, that communicate via the security bus 220. For example, the security bus 220 may use copper Ethernet in order to communicate with the BSUs 202.

According to some embodiments, each BSU 202 may be configured to connect between the CAN bus 210 and one of the ECUs 201. The BSUs 202 may (passively) monitor traffic in the CAN bus 210 (e.g., sniffing the traffic).

The BSUs 202 may be configured to connect to the CAN bus 210, where each BSU 202 may be coupled to at least one ECU 201. In some embodiments, each BSU 202 may be configured to detect abnormal communication on the CAN bus 210.

Figure 2B:
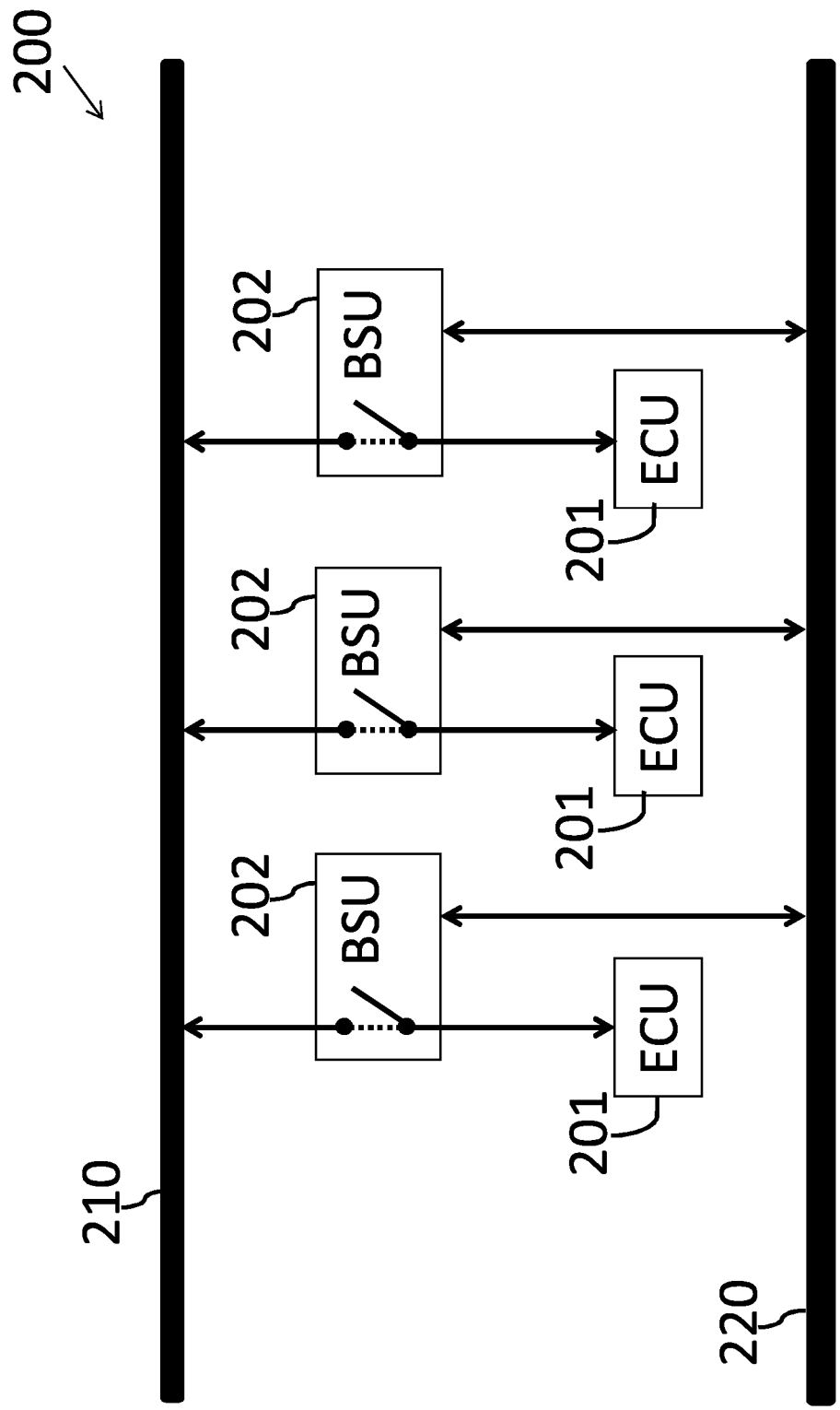
FIG. 2B shows a block diagram of the cyber security system, with a plurality of bus security units (BSUs) to disconnect ECUs from the vehicle bus, according to some embodiments of the invention.

Reference is now made to FIG. 2B, which shows a block diagram of the cyber security system 200, with a plurality of bus security units (BSUs) 202 to disconnect ECUs 201 from the CAN bus 210, according to some embodiments.

In some embodiments, the security bus 220 may act as an alternative bus in case of a failure in the CAN bus 210, for instance in case that one ECU 201 is non-responsive or compromised due to a malicious cyber-attack. The BSUs 202 may use the security bus 220 to bypass a compromised CAN bus 210 and bridge between usable (or functioning) ECUs 201. The security bus 220 may become an alternative or secondary bus in order to maintain critical messaging in case of complete CAN bus failure.

In some embodiments, in the event of a CAN bus 210 failure and/or a cyber-attack on the CAN bus 210, the critical ECUs may still function using the faster security bus 220 as the alternate bus.

In some embodiments, the BSUs 202 may emulate the CAN bus to the local ECUs 201, such that the ECUs 201 may function normally. This may allow maximum flexibility in message routing, where BSUs 202 may select the security bus 220 to route the message to another ECU 201 and/or to broadcast.

In some embodiments, the security bus 220 may provide faster communication compared to the CAN bus 210, for instance to ensure proper activity in case of emergency. For example, the security bus 220 may provide full-duplex Gigabit Ethernet, while CAN bus 210 may work with half-duplex 1 Mbps.

In some embodiments, the security bus 220 may have a star network topology, such that all BSUs 202 may be coupled to a central hub and/or coupled to each other. In such case, a single BSU 202 may be able to monitor all traffic in the CAN bus 210.

It should be noted that using a network with star topology, it may be possible to mitigate single points of failure (e.g., on the CAN bus or on the gateway) or a complete bus failure.

According to some embodiments, the BSUs 202 may sniff or monitor activity of the ECUs 201 and/or of the CAN bus 210, in order to identify abnormal behavior (e.g., a steering wheel always indicating left turns). In such a case, the cyber security system 200 may be a passive system that does not interfere with traffic in the CAN bus 210. For example, upon detection of abnormal behavior by a BSU 202, an alert may be issued to the operator of the vehicle and/or an external operator, while the traffic in the CAN bus 210 may continue.

In some embodiments, each BSU 202 may be configured to send the monitored activity to another BSU 202 on the secured bus 220. For example, a dedicated BSU 202 may receive monitored data from other BSUs 202 for analysis, such as detecting if the received data comprises abnormal behavior (e.g., based on a predefined threshold).

In some embodiments, each BSU 202 may be configured with direction sensing to identify if the direction of traffic is from the ECU 201 to CAN bus 210 or from CAN bus 210 to ECU 201. In some embodiments, each BSU 202 may include back to back CAN bus transceivers in order to monitor the traffic as well as identify the direction of traffic. Alternatively, a CAN bus repeater may be used.

Figure 2C:
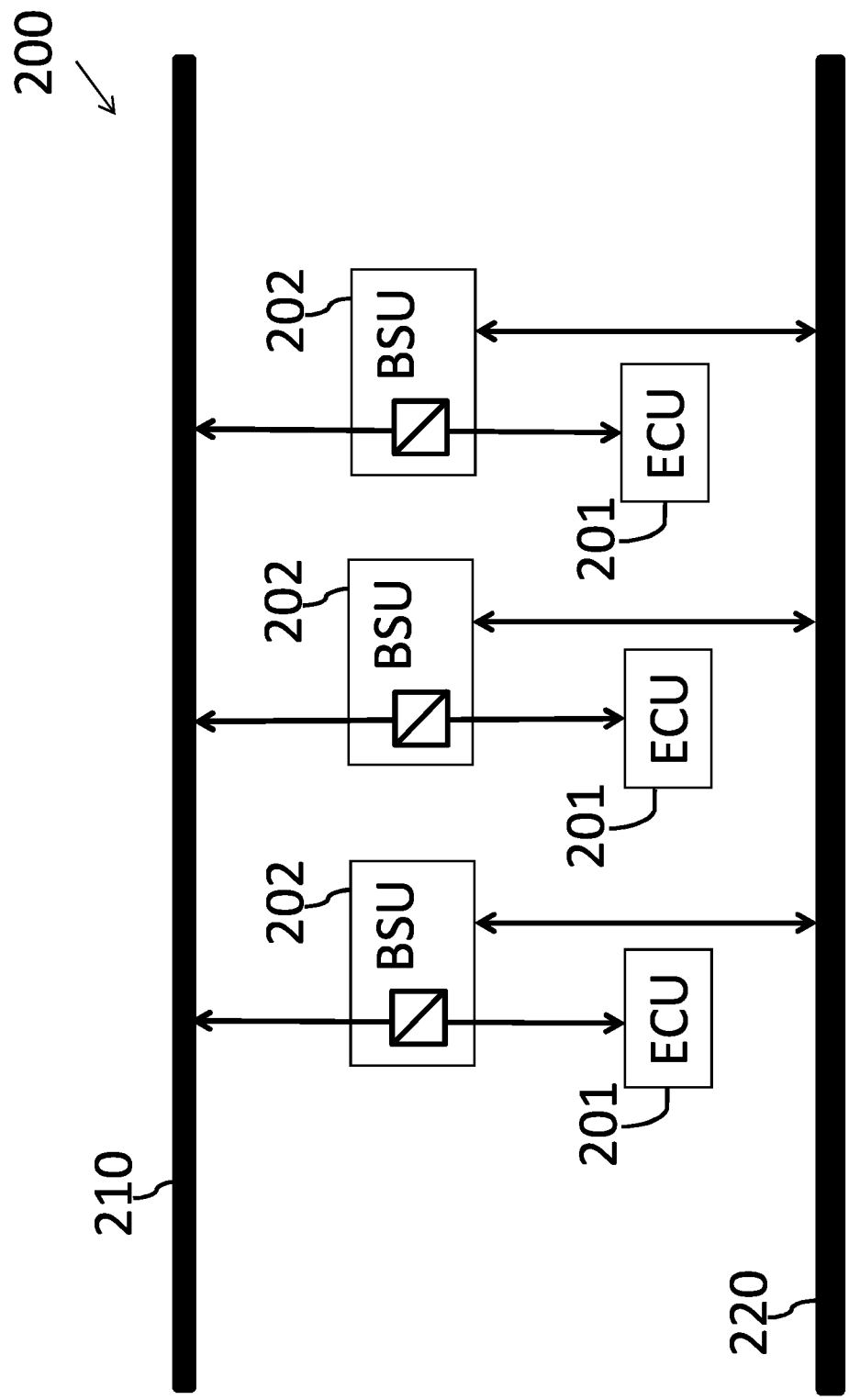
FIG. 2C shows a block diagram of the cyber security system, with firewalls controlled by the BSUs, according to some embodiments of the invention.

Reference is now made to FIG. 2C, which shows a block diagram of the cyber security system 200, with firewalls controlled by the BSUs 202, according to some embodiments of the invention.

According to some embodiments, the system 200 may be an active system that interferes with bus traffic by firewalling messages from compromised ECUs 201. In some embodiments, each BSU 202 may function as a firewall, where each BSU 202 may detect abnormal ECU 201 behavior and simultaneously protect the ECUs 201 from a compromised or damaged CAN bus 210 and/or protect the CAN bus 210 from compromised ECUs 201.

It should be noted that using the BSUs 202 as a firewall may mitigate at least one of: man-in-the-middle attacks, DDoS attacks, bus protocol violation, physical tampering, and/or unauthorized diagnostics.

According to some embodiments, each BSU 202 may be equipped with a plurality of separate bus interfaces, for instance three interfaces. In some embodiments, each BSU 202 may be equipped with a vehicle CAN 210 interface, and/or a vehicle security bus 220 interface (e.g., via Ethernet) and/or an ECU CAN 201 bus interface.

According to some embodiments, each BSU 202 may be configured to disconnect the corresponding ECU 201 from the CAN bus 210 and/or from the security bus 220. For example, in case that abnormal behavior is detected at a particular ECU 201, the BSUs 202 may drop specific messages or even completely isolate that ECU 201 from the CAN bus 210. Complete ECU isolation may enable the rest of the system to function normally. In another example, in case that abnormal behavior is detected at the CAN bus 210, the BSUs 202 may protect the ECUs 201 from messages/behavior of the compromised CAN bus 210.

According to some embodiments, the BSUs 202 may be configured to block ECUs 201 with detected abnormal communication. In this case, the system 200 is an active system that interferes with the bus traffic by disconnecting compromised ECUs 201. It should be noted that if a specific ECU 201 is disconnected, the vehicle may lose the normal functionality of the disconnected ECU, however that may be desirable if it is important to keep the vehicle in operation (e.g., for military use or airplanes).

Figure 3:
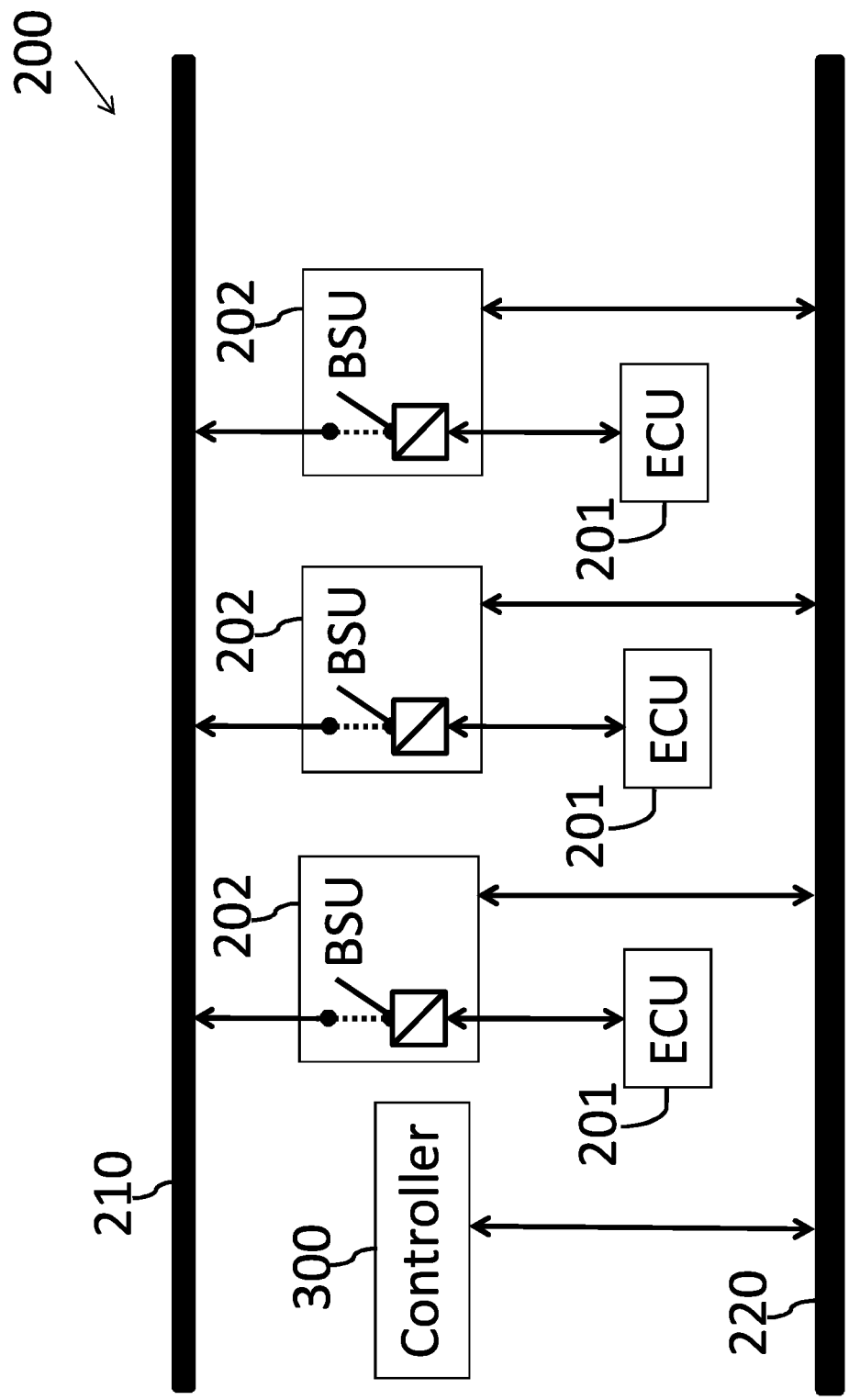
FIG. 3 shows a block diagram of the cyber security system with a controller, according to some embodiments of the invention.

Reference is now made to FIG. 3, which shows a block diagram of the cyber security system 200 with a controller 300, according to some embodiments. The controller 300 (e.g., such as controller 105 shown in FIG. 1) may be a security controller in operable communication with the secured bus 220 and/or with the BSUs 202.

In some embodiments, the controller 300 may collect and/or analyze all information received by the individual BSUs 202. For example, all BSUs 202 may transmit data via the secured bus 220 to be collected and/or analyzed by the controller 300. In some embodiments, the controller 300 may store the collected system logs (e.g., in a memory).

In some embodiments, the controller 300 may have the functionality of a layer 3 network switch. For example, the security bus 220 may have a star network topology and the controller 300 may function as a switch for the traffic in the network.

According to some embodiments, the controller 300 may power at least one BSU 202 via the security bus 220 using power over Ethernet (PoE). It should be noted that using PoE powering, physical attacks to disconnect the bus may be mitigated.

In some embodiments, the BSUs 202 may be independently powered may be capable of powering their corresponding ECU 201 through the supplied PoE. For instance, the BSUs 202 may power their corresponding ECU 201 when the CAN bus 210 fails, and the security bus 220 becomes the alternative bus.

In some embodiments, the controller 300 may be configured to analyze information received from the BSUs 202 and instruct the BSUs 202 to switch communication between the CAN bus 210 and the security bus 220.

In some embodiments, the controller 300 may collect and/or analyze information form the CAN bus 210 in order to determine the source of each message in the bus and accordingly find the root cause of any bus abnormality.

Reference is now made to FIG. 4A, which shows a block diagram of the cyber security system 200 with an ECU reset request 401, according to some embodiments. In case that a particular ECU 201 is determined to be compromised (e.g., by the controller 300 or by a BSU 202), the corresponding BSU 202 may attempt to reset a compromised ECU 201. For example, the corresponding BSU 202 may issue an ECU reset request 401 in an attempt to resume normal functionality.

In some embodiments, some critical ECUs 201 may be modified in order to accept external reset commands from the BSUs 202. For example, the BSU 202 may detect abnormal communication from at least one ECU 201 and accordingly issue the ECU reset request 401. The BSU 202 may use the security bus 220 to perform source and/or destination addressing and authentication for messages of the compromised at least one ECU 201.

In some embodiments, the BSU 202 may use the security bus 220 to perform message encryption, since the BSU 202 may have stronger processing power compared to the ECUs 201 (e.g., with dual ARM processors running at 2 GHz).

Figure 4B:
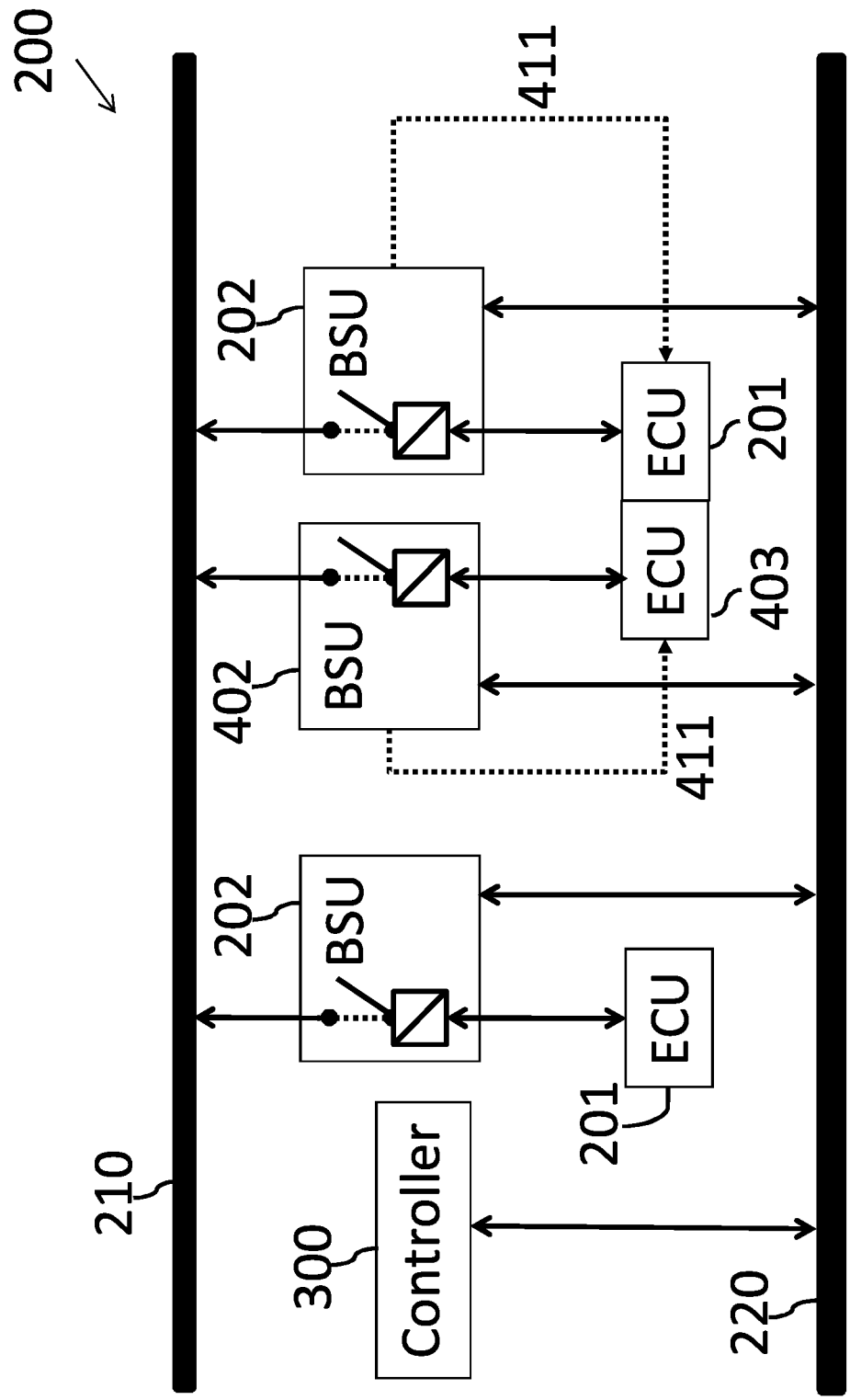
FIG. 4B shows a block diagram of the cyber security system with an ECU reset request for dual ECUs, according to some embodiments of the invention.

Reference is now made to FIG. 4B, which shows a block diagram of the cyber security system 200 with an ECU reset request 411 for a dual ECU 403, according to some embodiments. In some cases, a dual ECU 403 may be used in addition to an ECU 201 for a single critical component in the vehicle. For example, a dual ECU 403 may be coupled to an ECU 201 with dedicated sensors to be used for the engine to ensure operation even when one of the ECUs 201, 403 fails. A dedicated dual BSU 402 may be coupled to the dual ECU 403, for instance similarly to the BSU 202 of the pair ECU 201.

Both ECUs of the dual ECU 403 and ECU 201 may receive dedicated sensors and issue corresponding signals while operating at the same time, where only one selected controller may actually control the object (e.g., the engine, the breaking, the steering, etc.). To support full vehicle operation in case of ECU failure due to a cyber-attack or other malfunction, the ECUs are duplicated.

In some embodiments, the dual ECU 403 and ECU 201 that are coupled to the critical component in the vehicle may be modified to enable primary/secondary role change by the corresponding BSU 202 that issues the ECU reset request 411.

Figure 5:
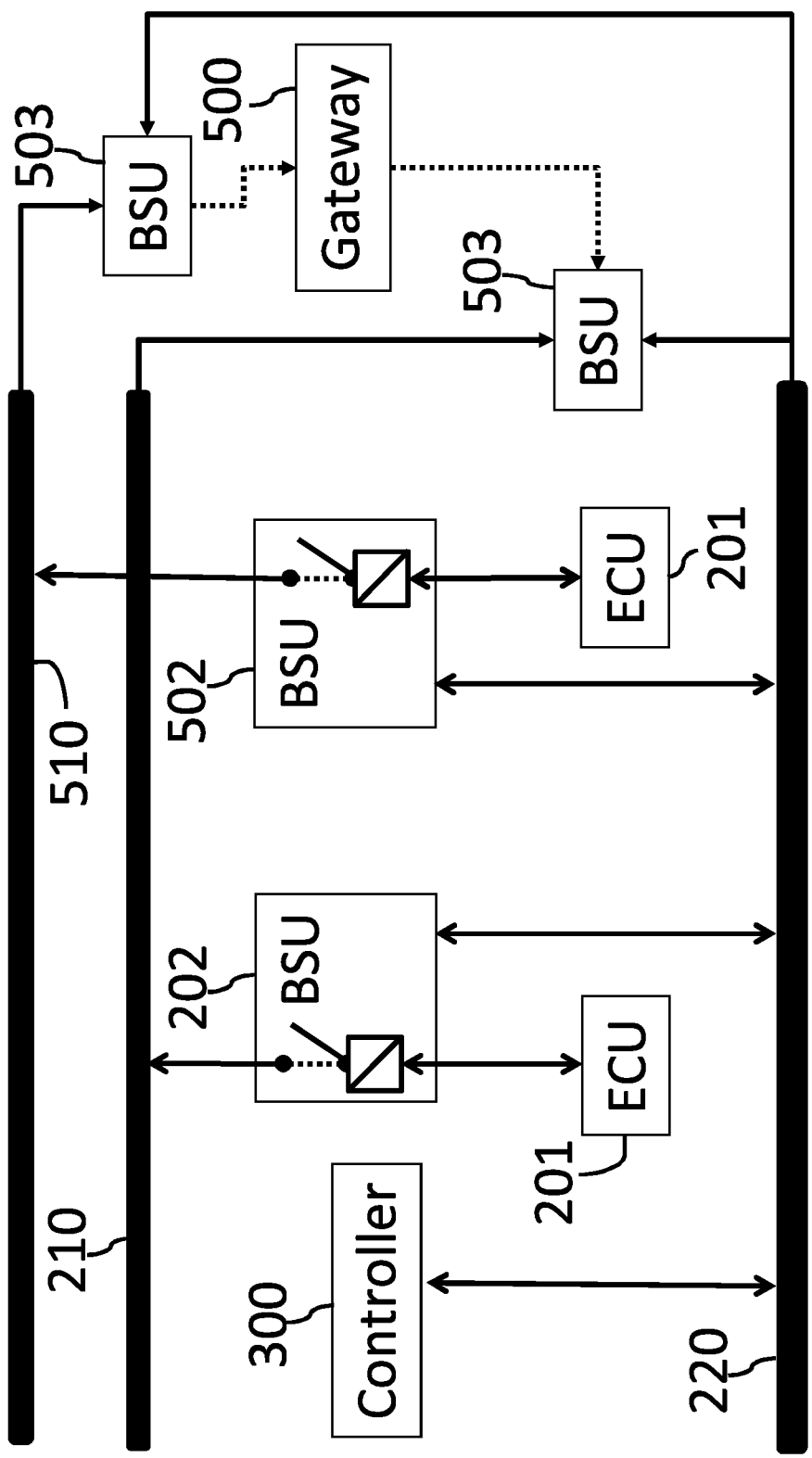
FIG. 5 shows a block diagram of the cyber security system with a gateway, according to some embodiments of the invention.

Reference is now made to FIG. 5, which shows a block diagram of the cyber security system 200 with a gateway 500, according to some embodiments. The CAN bus 210 may be in communication with a gateway 500, where the gateway 500 may be in communication with a third bus 510. In some embodiments, at least one BSU 502 may be configured to communicate with the third bus 510 instead of the CAN bus 210. The gateway 500 may be configured to ensure protection of communication in all of the buses in the in-vehicle network.

For example, the third bus 510 may be for non-critical components. A BSU 502 may be coupled to a corresponding ECU 501 of the third bus 510. In some embodiments, the BSU 502 may be configured to connect directly to the third bus 510, without ECUs 501. All communication may pass to the gateway 500, where dedicated gateway BSUs 503 coupled to the gateway may ensure protection of the communication. In some embodiments, at least one dedicated gateway BSU 503 may be configured to connect the gateway 500 with the security bus 220 and one of: the CAN bus 210 and the third bus 510.

Figure 6:
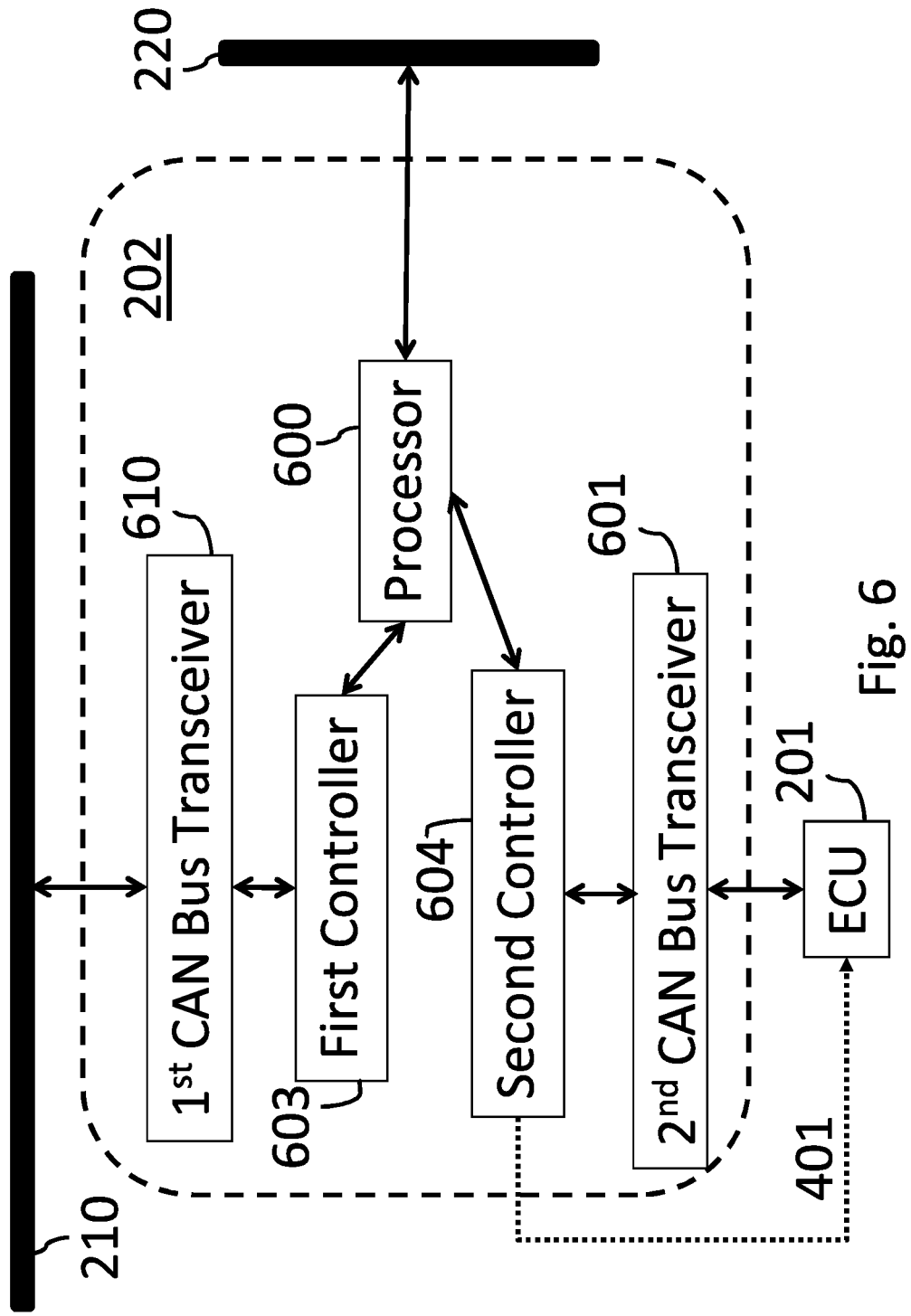
FIG. 6 shows a block diagram of an exemplary BSU, according to some embodiments of the invention.

Reference is now made to FIG. 6, which shows a block diagram of an exemplary BSU 202, according to some embodiments. The BSU 202 may include a processor 600 for analyzing received data, a first CAN bus transceiver 610 and a second CAN bus transceiver 601. The first CAN bus transceiver 610 may be configured to connect to the CAN bus 210, for instance using field programmable gate arrays (FPGA) implementation for detection of cyber attacks. Similarly, the second CAN bus transceiver 601 may be configured to connect to the corresponding ECU 201 (e.g., as shown in FIGS. 2A-2C), for instance using field programmable gate arrays (FPGA) implementation for detection of cyber attacks.

In some embodiments, each of the first CAN bus transceiver 610 and second CAN bus transceiver 601 may be coupled to a controller in order to facilitate the firewalling. The first CAN bus transceiver 610 may be coupled to a first controller 603 configured to implement ECU emulation. Similarly, the second CAN bus transceiver 601 may be coupled to a second controller 604 configured to implement bus emulation.

According to some embodiments, each one of the first controller 603 and the second controller 604 may be coupled to the processor 600. The processor 600 may be configured to receive data from the first controller 603 and the second controller 604 for analysis. In some embodiments, the processor 600 may be configured to perform at least one of: bus and/or ECU analysis, encryption/decryption of messages, authentication, addressing, message routing, firewalling, storing keys and/or logs, and controlling the ECU.

In some embodiments, the second controller 604 may issue a reset command 401 to the ECU 201 in case of emergency.

The processor 600 may be coupled to the security bus 220, via a secured interface, for secure communication. In some embodiments, the connection to the security bus 220 may power the BSU 202 via PoE.

Figure 7:
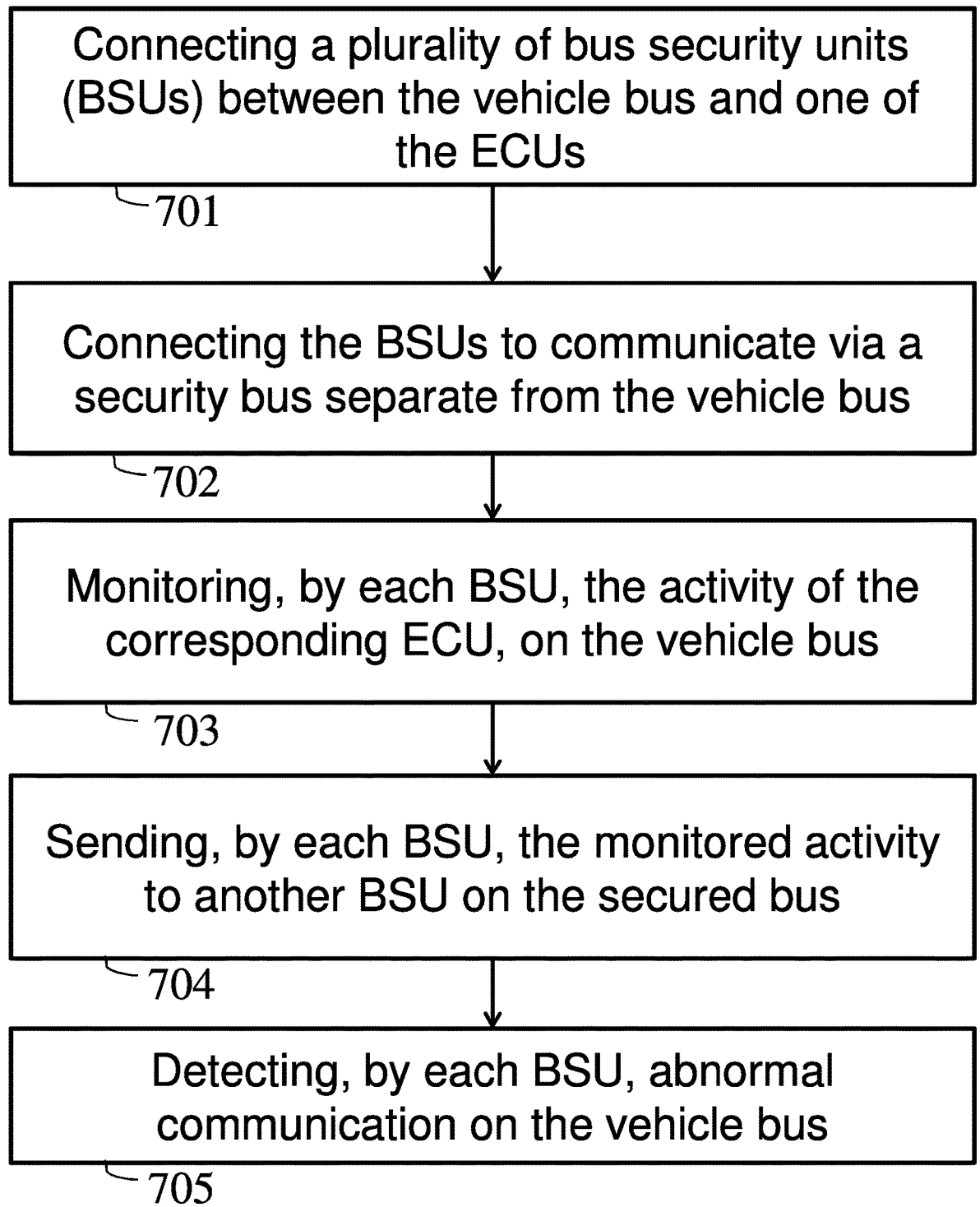
FIG. 7 shows a flowchart of a method of cyber security protection for in-vehicle networks comprising a plurality of electronic control units (ECUs) communicating via a controller area network (CAN) bus, according to some embodiments of the invention.

Reference is now made to FIG. 7, which shows a flowchart of a method of cyber security protection for in-vehicle networks comprising a plurality of electronic control units (ECUs) communicating via a controller area network (CAN) bus, according to some embodiments In Step 701, a plurality of bus security units (BSUs) may be connected between the CAN bus and one of the ECUs. In Step 702, the BSUs may be connected to communicate via a security bus separate from the CAN bus.

In Step 703, the activity of the corresponding ECU, may be monitored on the CAN bus by each BSU. In Step 704, the monitored activity may be sent to another BSU on the secured bus by each BSU. In Step 705, abnormal communication on the CAN bus may be detected by each BSU.

While certain features of the invention have been illustrated and described herein, many modifications, substitutions, changes, and equivalents may occur to those skilled in the art. It is, therefore, to be understood that the appended claims are intended to cover all such modifications and changes as fall within the invention.

Various embodiments have been presented. Each of these embodiments may, of course, include features from other embodiments presented, and embodiments not specifically described may include various features described herein.

The invention claimed is:

1. A cyber security system for in-vehicle networks comprising a plurality of electronic control units (ECUs) communicating via a vehicle bus, the system comprising:
    a plurality of bus security units (BSUs), wherein each BSU is configured to be connected between the vehicle bus and one of the ECUs, and the BSUs communicating via a security bus separate from the vehicle bus,
    wherein each BSU is configured to:
        monitor the activity of the corresponding ECU, on the vehicle bus;
        send the monitored activity to another BSU on the security bus;
        detect abnormal communication on the vehicle bus; and
        perform at least one of the following security operations:
            (a) disconnecting the corresponding ECU from the vehicle bus;
            (b) firewalling between the vehicle bus and the corresponding ECU; and
            (c) bridging between the corresponding ECU and another ECU by bypassing the vehicle bus using the security bus instead.

2. The system of claim 1, further comprising a controller, in operable communication with the BSUs, wherein the controller is configured to:
    analyze information received from the BSUs; and
    instruct the BSUs to switch communication between the vehicle bus and the security bus.

3. The system of claim 1, wherein the BSUs are configured to block ECUs with detected abnormal communication.

4. The system of claim 1, wherein the BSUs are configured to switch communication from the vehicle bus to the security bus upon detection of a potential cyber-attack.

5. The system of claim 1, wherein the BSUs are configured to reset ECUs with detected abnormal communication.

6. The system of claim 1, wherein the BSUs are configured to use the security bus to perform at least one of: source and destination addressing for messages of at least one compromised ECU.

7. The system of claim 1, wherein the vehicle bus is in communication with a gateway, wherein the gateway is in communication with a third bus, and wherein at least one BSU is in operable communication with the gateway.

8. The system of claim 7, wherein for each bus, at least one BSU is configured to monitor communication to the gateway.

9. The system of claim 1, wherein the security bus comprises at least one of an optical and a copper local area network (LAN).

10. The system of claim 1, wherein the vehicle bus is at least one of CAN Bus 2.0, CAN bus 2.0A, CAN Bus 2.0B, CAN FD 1.0 and ISO-11898.

11. A method of cyber security protection for in-vehicle networks comprising a plurality of electronic control units (ECUs) communicating via a vehicle bus, the method comprising:
    connecting a plurality of bus security units (BSUs) between the vehicle bus and one of the ECUs;
    connecting the BSUs to communicate via a security bus separate from the vehicle bus;
    monitoring, by each BSU, the activity of the corresponding ECU, on the vehicle bus;
    sending, by each BSU, the monitored activity to another BSU on the security bus;
    detecting, by each BSU, abnormal communication on the vehicle bus; and performing at least one of the following security operations:
(a) disconnecting the corresponding ECU from the vehicle bus;
(b) firewalling between the vehicle bus and the corresponding ECU; and
(c) bridging between the corresponding ECU and another ECU by bypassing the vehicle bus and using the security bus instead.

12. The method of claim 11, further comprising:
analyzing information received from the BSUs, by a controller, in operable communication with the BSUs; and
instructing the BSUs to switch communication between the vehicle bus and the security bus.

13. The method of claim 11, further comprising blocking, by the BSUs, ECUs with detected abnormal communication.

14. The method of claim 11, further comprising switching, by the BSUs, communication from the vehicle bus to the security bus upon detection of a potential cyber-attack.

15. The method of claim 11, further comprising resetting, by the BSUs, ECUs with detected abnormal communication.

16. The method of claim 11, further comprising using, by the BSUs, the security bus to perform at least one of: source and destination addressing for messages of at least one compromised ECU.

17. The method of claim 11, further comprising monitor communication to a gateway in communication with the vehicle bus, wherein the gateway is in communication with a third bus, and wherein at least one BSU is in operable communication with the gateway.

18. A bus security unit (BSU) for communication with an electronic control unit (ECU) communicating via a vehicle bus, the BSU comprising:
at least one vehicle bus transceiver, configured to communicate with at least one of the ECU and the vehicle bus;
at least one controller, coupled to the at least one vehicle bus transceiver, wherein the at least one controller is configured to block communication with detected abnormal messages; and
a secured interface, configured to connect the BSU to a security bus separate from the vehicle bus,
wherein the BSU is configured to:
monitor the activity of the ECU, on the vehicle bus;
send the monitored activity to another BSU on the security bus;
detect abnormal communication on the vehicle bus; and
perform at least one of the following security operations:
(a) disconnecting the corresponding ECU from the vehicle bus;
(b) firewalling between the vehicle bus and the corresponding ECU; and
(c) bridging between the corresponding ECU and another ECU by bypassing the vehicle bus using the security bus instead.

19. The BSU of claim 18, wherein the at least one controller is configured to emulate at least one of the ECU and the vehicle bus.

20. The BSU of claim 18, wherein processor is configured to perform at least one of: encryption/decryption of messages, authentication, addressing, message routing, firewalling, storing keys and/or logs, and controlling the ECU.

* * * * *